US010440642B2

(12) United States Patent
Zait

(10) Patent No.: US 10,440,642 B2
(45) Date of Patent: *Oct. 8, 2019

(54) NETWORK SLICE SELECTION IN WIRELESS TELECOMMUNICATION NETWORKS

(71) Applicant: T-Mobile USA, Inc., Bellevue, WA (US)

(72) Inventor: Hichem Zait, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,809

(22) Filed: Apr. 10, 2018

(65) Prior Publication Data

US 2018/0234915 A1 Aug. 16, 2018

Related U.S. Application Data

(63) Continuation of application No. 15/451,493, filed on Mar. 7, 2017, now Pat. No. 9,961,624.

(60) Provisional application No. 62/456,943, filed on Feb. 9, 2017.

(51) Int. Cl.
*H04W 4/00* (2018.01)
*H04W 48/18* (2009.01)
*H04W 60/00* (2009.01)
*H04W 8/20* (2009.01)
*H04W 48/16* (2009.01)
*H04L 12/911* (2013.01)
*H04W 88/16* (2009.01)

(52) U.S. Cl.
CPC ............ *H04W 48/18* (2013.01); *H04L 47/78* (2013.01); *H04W 8/20* (2013.01); *H04W 48/16* (2013.01); *H04W 60/00* (2013.01); *H04W 88/16* (2013.01)

(58) Field of Classification Search
CPC ... H04W 48/18; H04W 8/20; H04W 28/0284; H04W 48/16; H04W 60/00; H04W 88/16
USPC .................................................... 455/435.2
See application file for complete search history.

(56) References Cited

U.S. PATENT DOCUMENTS 9,003,057 B2    4/2015  Mahaffey et al.
9,014,663 B2    4/2015  Saker et al.
9,393,366 B2 *  7/2016  Gannon ............... A61M 5/172
(Continued)

OTHER PUBLICATIONS

ITRI, "Identities used for Network Slicing in Section 5.7 Identities", S2-170298, 3GPP SA WG2 Meeting #118bis, Spokane, USA, Jan. 10, 2017, section 1, 2 pages.
(Continued)

*Primary Examiner* — Marceau Milord
(74) *Attorney, Agent, or Firm* — Lee & Hayes, P.C.

(57) ABSTRACT

A wireless telecommunication system may utilize multiple network slices, each of which may implement a different core network. In order to route initial attach requests to appropriate network slices and corresponding core networks, a mobility management component sends a received initial attach request to a network slice selector. The network slice selector queries a selection policy function to obtain a designation of a particular network slice to which the attach request should be directed. The network slice selector then sends a redirect request to the mobility management component, instructing the mobility management component to resend the attach request to the designated network slice.

10 Claims, 5 Drawing Sheets

(56) References Cited

U.S. PATENT DOCUMENTS

| | | | |
|---|---|---|---|
| 9,693,366 B2 | 6/2017 | Adjakple et al. | |
| 9,961,624 B1* | 5/2018 | Zait | H04W 48/18 |
| 9,961,713 B2* | 5/2018 | Salkintzis | H04W 76/27 |
| 10,111,163 B2* | 10/2018 | Vrzic | H04W 12/06 |
| 2010/0099393 A1* | 4/2010 | Brisebois | H04M 15/00 455/418 |
| 2013/0007232 A1 | 1/2013 | Wang et al. | |
| 2013/0208792 A1 | 8/2013 | He et al. | |
| 2013/0246199 A1* | 9/2013 | Carlson | G06Q 20/20 705/16 |
| 2014/0086177 A1* | 3/2014 | Adjakple | H04W 12/08 370/329 |
| 2014/0317894 A1 | 10/2014 | Pirker | |
| 2016/0212017 A1 | 7/2016 | Li et al. | |
| 2016/0234828 A1* | 8/2016 | Smith | H04W 4/21 |
| 2016/0337919 A1 | 11/2016 | Bindrim et al. | |
| 2016/0353367 A1* | 12/2016 | Vrzic | H04W 12/06 |
| 2016/0353465 A1* | 12/2016 | Vrzic | H04W 12/06 |
| 2016/0360408 A1 | 12/2016 | Senarath et al. | |
| 2017/0142591 A1* | 5/2017 | Vrzic | H04W 24/08 |
| 2017/0208011 A1 | 7/2017 | Bosch et al. | |
| 2017/0245316 A1* | 8/2017 | Salkintzis | H04W 76/27 |
| 2017/0257886 A1* | 9/2017 | Adjakple | H04W 12/08 |
| 2018/0077637 A1* | 3/2018 | Basilier | H04W 48/18 |
| 2018/0227873 A1* | 8/2018 | Vrzic | H04W 76/27 |
| 2018/0270744 A1* | 9/2018 | Griot | H04W 48/18 |
| 2018/0332441 A1* | 11/2018 | Shaw | H04W 4/70 |
| 2019/0007899 A1* | 1/2019 | Vrzic | H04W 48/18 |

OTHER PUBLICATIONS

Nokia, "Interim Agreements based on Way Forward on Solutions for Key Issue 1 on Network Slicing", S2-165698, 3GPP SA WG2 Meeting #117, Kaohsiung, Taiwan, Oct. 11, 2016, section 8.1., 2 pages.

PCT Search Report and Written Opinion dated May 8, 2018 for PCT Application PCT/US18/14974, 14 pages.

ZTE, "Proposed alignments of Network Slicing Conclusion with 5G Core Overall Architecture", Sprint, S2-170168, 3GPP SA WG2 Meeting #118bis, Spokane, USA, Jan. 10, 2017, 8 pages.

ZTE, "Proposed Network Slicing Update to 23.501 Clause 5.13", S2-170169, 3GPP SA WG2 Meeting #118bis, Spokane, USA, Jan. 10, 2017, section 5.13, 4 pages.

Ericsson Corporate Communications, "Ericsson and SK Telecom Demonstrate 5G Network Slicing Technology," retrieved on Nov. 28, 2017, at https://www.ericsson.com/en/news/2015/10/ericsson-and-sk-telecom-demonstrate-5g-network-slicing-technology, Ericsson, 7 pages.

Ericsson Corporate Communications, "Network Slicing," retrieved on Nov. 28, 2017, at https://www.ericsson.com/en/networks/topics/network-slicing, Ericsson, 11 pages.

Ericsson Corporate Communications, "DOCOMO and Ericsson perform successful Proof of Concept of dynamic 5G network slicing" retrieved on Nov. 28, 2017, at https://www.ericsson.com/en/news/2016/6/docomo-and-ericsson-perform-successful-proof-of-concept-of-dynamic-5g-network-slicing, Ericsson, 8 pages.

* cited by examiner

NETWORK SLICE SELECTION IN WIRELESS TELECOMMUNICATION NETWORKS

CROSS-REFERENCE TO RELATED APPLICATION

This application is a continuation of and claims priority to U.S. patent application Ser. No. 15/451,493, filed Mar. 7, 2017, which claims priority to U.S. Provisional Patent Application No. 62/456,943 filed Feb. 9, 2017, of the same title, which are incorporated herein by reference in their entirety.

BACKGROUND

Wireless communication networks face many challenges due to rapid increases in the numbers of network users and the wide-spread use of mobile and other wireless applications.

Network slicing is a technology that has been proposed to enhance flexibility in wireless communication networks. Network slicing allows multiple logical networks to operate using a common underlying infrastructure. Network slicing can reduce costs of deployments, increase the efficiencies of physical infrastructures, and provide flexibility in the types of services that may be offered to different users.

A slice-based communications network can have multiple software-defined core networks, referred to as slices, each of which may be optimized for a different type of service. For example, an LTE (Long-Term Evolution) core network can be provided for 4G ($4^{rd}$-Generation) LTE services and an IMS (IP Multimedia Subsystem) core network can be provided for multimedia messaging. Generally, network slices can be provided for many different purposes, such as Internet browsing, voice communications, industrial control, home automation, IoT (Internet of Things), etc. Furthermore, different slices may be configured to provide different Qualities of Service (QoS). For example, one core network may be designed for low latency while another core network might be designed to provide fast streaming.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems, configurations, interfaces, and techniques that may be used within wireless telecommunication networks to enable and enhance the use of virtual network slices.

A wireless communication device, referred to as a UE (user equipment), communicates through a RAN (radio access network) with a mobility management component when connecting to a wireless communication network. In non-sliced networks, upon receiving an initial attach request from the UE the mobility management component selects an appropriate mobility controller of the network, such as an SGW (Serving Gateway) of an LTE (Long-Term Evolution) network. In traditional 4G systems, the mobility controller is selected primarily based on geographical considerations, so that a nearby mobility controller is selected to provide services for a particular UE. In slice-based systems, however, the attach request needs to be sent to and processed by an appropriate one of multiple available networks slices, each of which might implement a core network for a different type of service.

In certain embodiments described below, attach requests are sent from the mobility management component to a network slice selector. The network slice selector in turn queries a slicing selection policy function, which provides information to the network slice selector regarding which of multiple available network slices should be selected to handle a particular initial attach request. The network slice selector then redirects the initial attach request to the selected network slice.

Figure 1:
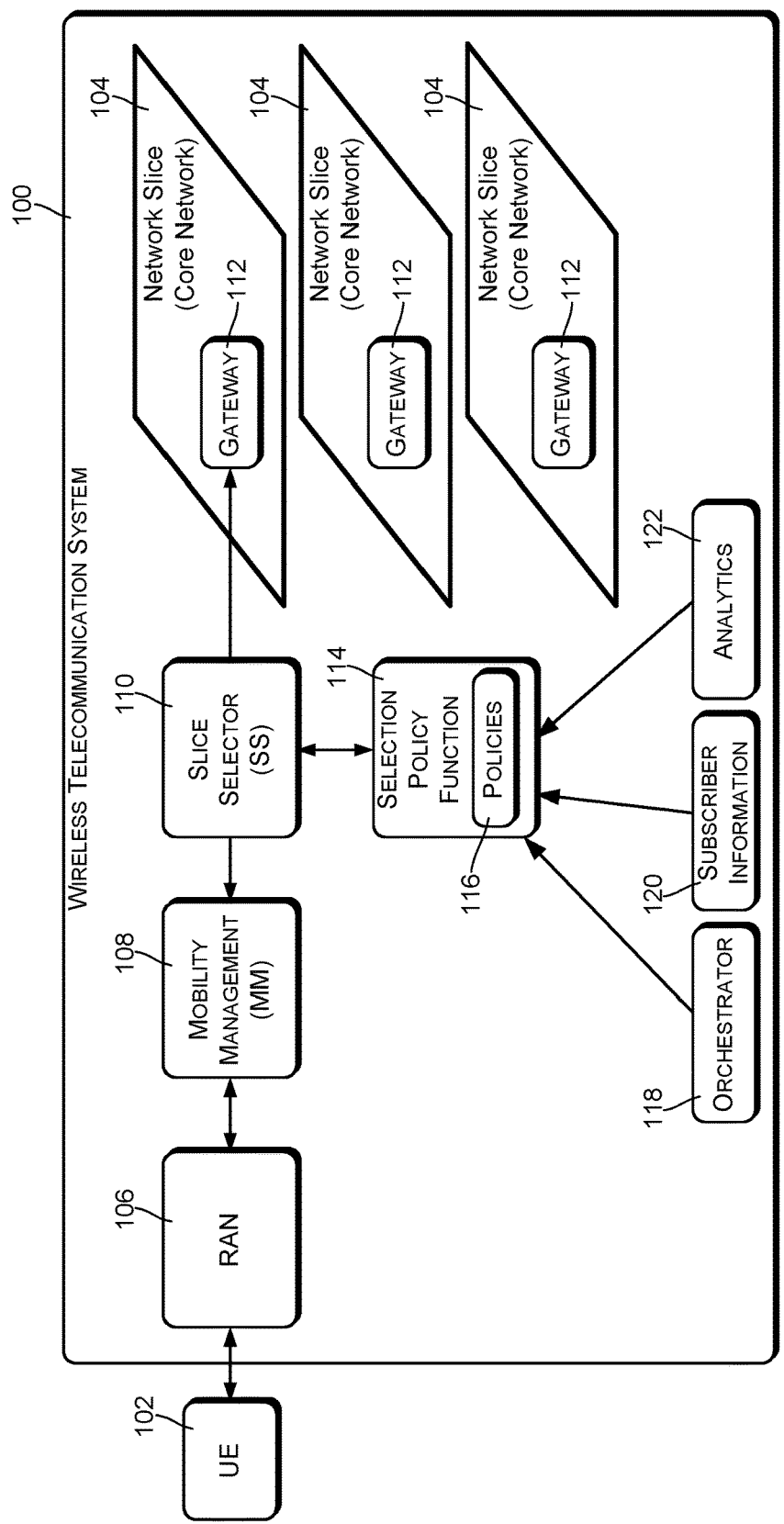
FIG. 1 is a block diagram of a wireless telecommunication system that implements techniques for selecting from multiple available network slices.

FIG. 1 shows an example wireless telecommunication network or system 100 that implements network slicing. Note that FIG. 1 shows only those components of the system 100 that are most relevant to the current discussion. In particular, FIG. 1 shows top-level components involved in handling an initial attach request from a wireless communication device 102, which is also referred to herein as a UE (User Equipment) 102. In practice, the system 100 may have many other components and functional elements, in addition to those shown.

The system 100 has multiple network slices 104, three of which are shown in FIG. 1 for purposes of illustration, although the system 100 may have any number of network slices 104. In certain embodiments, each network slice 104 may correspond to or comprise a dedicated core network. Different core networks may be provided for different types of services, for different types of customers, for different types of traffic, to provide different levels of QoS (Quality of Service), etc.

In certain embodiments, the network slices 104 may comprise software-defined networks, and may at times be referred to as "virtual" network slices. In certain situations, network slices may be dynamically created and destroyed in response to increasing and decreasing demands for services. Dedicated network slices may also be dynamically created for certain customers and certain types of customers.

The UE 102 may comprise a wireless communication device such as a smartphone, or may comprise any other device having cellular or other wireless communication capabilities, such as tablet computers, wearable devices, controllers, entertainment devices, electronic book readers, automation equipment, automotive equipment, monitoring equipment, security equipment, media devices, etc.

An initial attach request is sent by the UE 102 through a RAN (Radio Access Network) 106 to a mobility management component 108. In 4G ($4^{th}$ Generation) LTE (Long- Term Evolution) networks, the mobility management component 108 comprises what is known as an MME (Mobility Management Entity). In next-generation 5G ($5^{th}$ Generation) systems, the mobility management component 108 may be referred to more generally as a control plane function.

The mobility management component 108 is configured to respond to an initial attach request by sending a create session request to a network slice selector 110, also referred to herein as a slice selector and/or a network selector. In LTE networks, the create session request is sent over a logical communication interface that is referred to as an S11 interface. The S11 interface is typically used for messaging between the MME and SGW (Serving Gateway) of an LTE network. In 5G networks, the create session request may be sent over a logical communication interface that is referred to as an NG4 interface. The NG4 interface is typically used for messaging between the control plane function and the user plane forwarding function of a 5G network.

In response to receiving a create session request, the network slice selector 110 determines which of the available network slices 104 should be used to provide services for the requesting UE 102, and redirects the create session request to the selected network slice 104. For example, the create session request may be directed to a gateway component 112 of the selected network slice. In an LTE network, the gateway component 112 may comprise an SGW. In a 5G network, the gateway component may comprise a user plane forwarding function.

In order to select one of the network slices 104, the network slice selector 110 queries a slice selection policy function 114. The slice selection policy function 114 may comprise a physical or logical component. In some cases, the slice selection policy function 114 may be implemented by the network slice selector 110.

The slice selection policy function 114 selects one of the network slices 104 based on policies 116, which may be provided or defined by the provider of the system 100, such as a telecommunications provider. The selection of a network slice 104 may also be based on other inputs, obtained from other system components. As an example, the slice selection policy function 114 may receive information from a network slice orchestrator 118 regarding currently instantiated and available network slices. In particular, the orchestrator may provide information regarding the IDs and network addresses of available network slices and the services to which the network slices correspond. The orchestrator 118 may also provide information regarding the characteristics of provided services, such as QoS information regarding the services provided by individual network slices. In some systems, the network slice orchestrator 118 may be accessible using REST (Representational State Transfer) network communication interfaces.

Aa another example, the slice selection policy function 114 may receive information from subscriber information databases 120, such as an SPR (Subscriber Profile Repository) or NDS (name domain system) in LTE systems, or a UDM (User Data Management) function in 5G systems. The subscriber information databases 120 may provide a user profile indicating information regarding the device from which the attach request has been received, such as subscribed services, contracted QoS (Quality of Service) parameters, subscriber category, and charging related data.

As yet another example, the slice selection policy function 114 may receive information from analytics components 122 of the system 100. The analytics components 122 may indicate information such as relative congestion of the different network slices 104. Selection of a particular network slice may at times be performed in order to balance loads or congestion of available network slices. As with the orchestrator 118, the analytic components 122 may be accessed using REST network communication interfaces.

The information obtained from the orchestrator 118, the subscriber information databases 120, the analytic components 122, and possibly other sources is evaluated against the policies 116 by the slice selection policy function 114 to select one of the network slices 104 and to return an identification of the selected network slice 104 to the slice selector 110. In some embodiments, the slice selection policy function 114 may provide a network address of the selected network slice 104 to the slice selector 110 in order to identify the selected network slice 104. For example, the slice selection policy function 114 may provide the network IP (Internet Protocol) address of the gateway 112 of the selected network slice 104.

The slice selector 110 may communicate with the slice selection policy function 114 using a logical interface that is similar to the LTE Diameter Gx interface, or using any other logical interface protocol.

Figure 2:
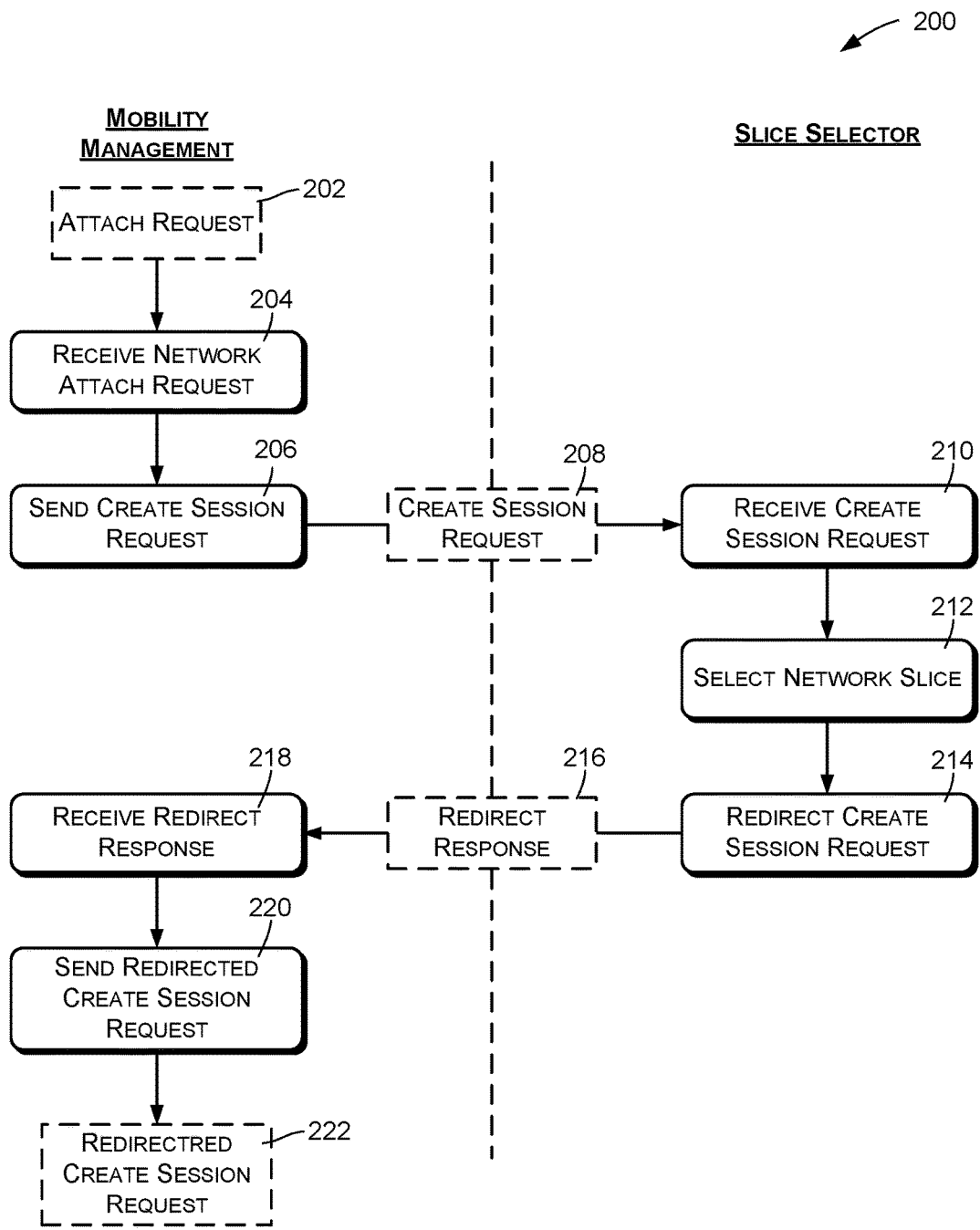
FIGS. 2 is a flow diagram illustrating an example method of directing network attach requests to individual network slices.

FIG. 2 illustrates an example method 200 that may be performed in order to implement network slice selection in a system such as described above, in response to receiving a network attach request 202 such as an initial attach request originating from the UE 102. Actions on the left of FIG. 2 are performed by the mobility management component 108. Actions on the right of FIG. 2 are performed by network slice selector 110. Although the method 200 will be described with reference to the components of FIG. 1, the method 200 may also be performed in systems having different configurations.

An action 204 comprises receiving the network attach request 202. The attach request 202 may be provided in accordance with LTE or 5G standard protocols, and may indicate the IMEI (International Mobile Equipment Identify) of the UE 102 and an IMSI (International Mobile Subscriber Identity) of the UE 102. The attach request may also specify an APN (Access Point Name) and an MCC/MCC (Mobile Country Code/Mobile Network Code). It is assumed in this example that the UE 102 is subscribed for services with the wireless telecommunication system 100, and that the subscriber information databases 120 include a subscriber profile and/or other information corresponding to the IMEI of the UE 102.

An action 206 comprises creating and sending a create session request 208 to the network slice selector 110. The create session request may be formatted and provided in accordance with LTE and/or 5G protocols, except that it is sent to the network slice selector 110 rather than to a network mobility controller such as an SGW. Among other information, the create session request 208 indicates the IMEI, IMSI, APN, and MCC/MCN provided by the attach request 202. In LTE environments, the create session request 208 may be sent over an S11 logical interface as described above. In 5G environments, the initial create session request 208 may be sent over an NG4 logical interface.

An action 210, performed by the network slice selector 110, comprises receiving the create session request 208.

An action 212 comprises selecting one of multiple network slices 104 and/or corresponding core networks that are available in the system 100. The selection may be based at least in part on the policies 116 and at least in part on other information obtained from various sources. For example, the selection may be based at least in part on the subscriber profile associated with the UE 102, as obtained from the subscriber information databases 120. The subscriber profile may, for example, indicate the type of services to which the UE 102 is subscribed, including contracted QoS parameters. The selection may also be based at least in part on which of multiple services is associated with each of the available network slices and the QoS parameters provided by the network slices, with a goal of matching the subscribed services of the UE 102 with a network slice that will provide those services. In some cases, the selection may additionally be based on current or historical levels of slice congestion, in order to balance loads among existing network slices.

An action 214, performed by the slice selector 110, comprises redirecting the create session request 208 to the network slice or core network that has been selected in the action 212. In certain implementations, this may comprise sending or returning a redirect response 216 to the mobility management component 108, where the redirect response 216 identifies the selected network slice. For example, the redirect response 216 may specify the network IP address of a gateway 112 of the selected network slice. This communication can be performed over an S11 or NG4 interface.

An action 218, performed by the mobility management component 108, comprises receiving the redirect response 216.

An action 220 comprises sending a redirected create session request 222 to the network slice or core network specified by the redirect response 216. For example, the create session request 208 may be resent to the network IP address specified by the redirect response 216. The redirected create session request 222 may be formatted in accordance with LTE or 5G protocols. Further communications and actions are then performed by various components of the system 100 in accordance with applicable protocols in order to process the redirected session request 222 and allow the UE to connect to the selected network slice 104.

Figure 3:
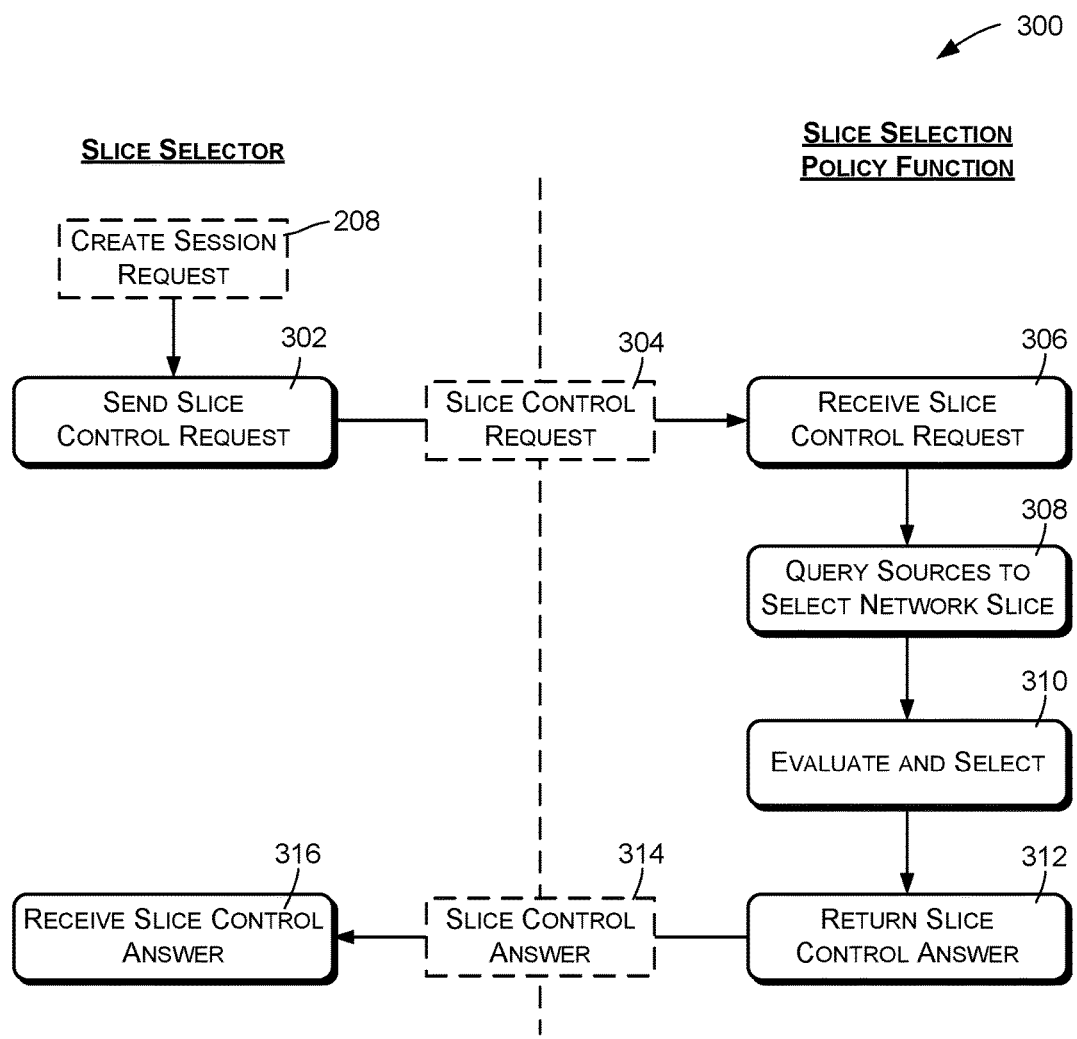
FIG. 3 is a flow diagram illustrating an example method of selecting one of multiple individual network slices.

FIG. 3 illustrates a method 300 that may be performed in certain embodiments as part of the action 212 of selecting a network slice, in response to the slice selector 110 receiving the create session request 208. Actions on the left of FIG. 3 are performed by the slice selector 110. Actions on the right of FIG. 3 are performed by the slice selection policy function 114 based on the policies 116.

An action 302 comprises querying the slice selection policy function 114 by sending a slice control request 304, also referred to as a slice control request 304, to the slice selection policy function 114. The slice control request 304 may be communicated using a logical interface similar to the Diameter Gx interface, which is used in other parts of LTE systems, for example. In certain embodiments, the slice control request 304 may specify the IMEI and IMSI associated with the requesting UE 102. In some cases, the slice control request 304 may also specify the APN to which the initial attach request was directed. The slice control request 304 may also specify the MCC/MNC associated with the UE 102.

An action 306, performed by the slice selection policy function 114, comprises receiving the slice control request 304.

An action 308 comprises querying various data sources to obtain information relating to slice selection. For example, the action 308 may comprise querying the subscriber information databases 120 to obtain a user profile, which might indicate the type of services expected by the UE 102 as well as QoS levels to which the UE 102 is subscribed. The action 308 may also comprise querying the orchestrator 118 to determine which network slices are available, as well as the services and capabilities provided by those slices. The action 308 may also comprise querying the analytics component 122 to determine current network congestion in the available network slices.

An action 310 comprises evaluating the information obtained in the action 308 against the policies 116 to identify and select one of the network slices 104 that meets the needs of the requesting UE 102, based at least in part on the policies 116. For example, a network slice may be selected that provides the type of service expected by the UE 102 as well as the QoS expected by the UE 102. The action 310 may also take network congestion into account, and may select a network slice 104 such that traffic and loads are distributed evenly across the network slices 104 and/or the corresponding dedicated core networks. For example, in cases where more than one network slice 104 meets the needs of the UE 102, the network slice having the lowest load might be selected.

An action 312 comprises returning a slice control answer 314 to the network slice selector 110. The slice control answer 314 specifies the selected one of the network slices 104. In various embodiments, the slice control answer 314 may specify the network IP address of a gateway 112 of the selected one of the network slices 104. The slice control answer 314 may be communicated using a logical interface similar to the Diameter Gx interface as mentioned above.

An action 316, performed by the network slice selector 110, comprises receiving the slice control answer 314. In the context of FIG. 2, the returned network IP address of the selected network slice 104 may then be provided to the mobility management component as part of the redirect response 216.

Figure 4:
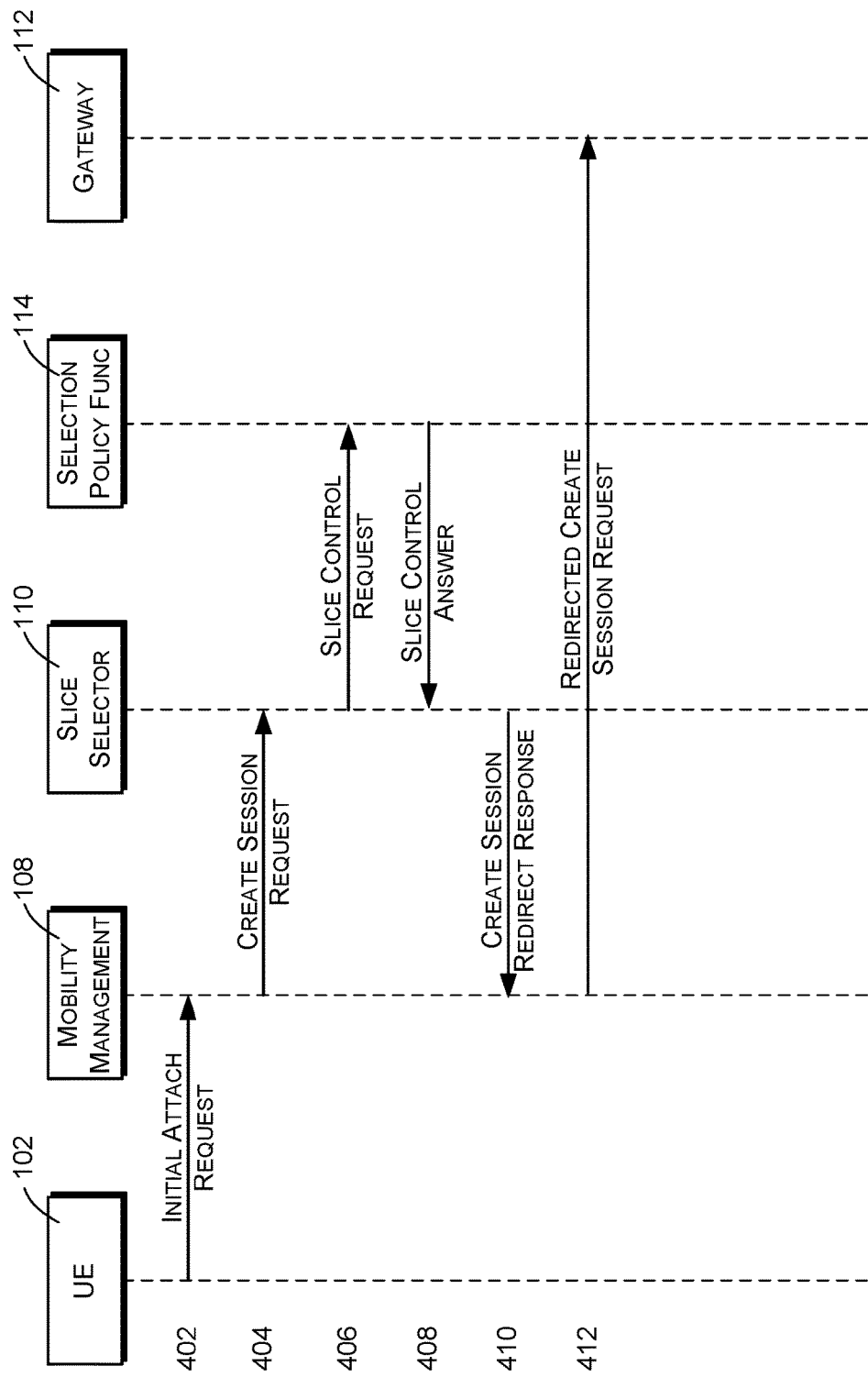
FIG. 4 is a communication sequence diagram illustrating an example communication sequence for routing initial attach requests to selected network slices.

FIG. 4 illustrates further details regarding communications between the components shown in FIG. 1. In FIG. 4, communicating components or entities are shown along the top, with a corresponding dashed vertical line extending downward. Communications are indicated by arrows that extend horizontally from and to the vertical lines corresponding to the entities from that originate and receive the communications. Communications occur in order from top to bottom. An individual communication or set of communications is indicated by a corresponding reference numeral along the left side of the figure, horizontally aligned with the arrow or arrows representing the communication.

Note that FIG. 4 illustrates the most relevant communications and may omit other communications that occur in practice but are less relevant to the topics at hand. Such other communications may include communications that both precede and follow the illustrated communications, communications that occur in time between the illustrated communications, and communications that occur between components or entities that are not specifically shown.

At 402, the UE 102 sends an initial attach request, which is received by the mobility management component 108. The initial attach request may include one or more of the IMEI of the UE 102, the IMSI of the subscriber associated with the UE 102, an APN, and the MCC/MNC associated with the UE 102.

In response to receiving the initial attach request, at 404 the mobility management component 108 sends a create session request to the slice selector 110. This communication may be performed over an S11 logical interface in LTE environments and over an NG4 logical interface in 5G environments. The create session request is formatted in accordance with LTE or 5G standards and includes one or more of the IMEI, IMSI, APN, and MCC/MNC as mentioned above.

In response to receiving the create session request, at 406 the slice selector 110 sends a slice control request to the selection policy function 114. The slice control request specifies the IMEI, IMSI, APN, and MCC/MNC associated with the initial attach request.

In response to receiving the slice control request, the selection policy function 114 selects one of multiple available network slices, as discussed above with reference to the action 310 of FIG. 3. At 408, the selection policy function 114 specifies the selected network slice in a slice control answer that is sent to the slice selector 110. In certain embodiments, the slice control answer specifies the network IP address of a component, such as a gateway component, of the selected network slice.

At 410, the slice selector sends a create session redirect response to the mobility management component 108, specifying the selected network slice. For example, the create session redirect response may specify the network IP address that has in turn been specified by the slice control answer.

At 412, the mobility management component 108 is responsive to the create session redirect response to send a new, redirected create session request to the selected network slice. Specifically, a second create session response is sent to the network IP address of a gateway, such as an SGW, of the selected network slice. The network IP address to which the second create session response is sent is the IP address returned by the slice control answer and the create session redirect response.

Processing of the redirected create session request then proceeds using conventional protocols or other protocols that may be specific to particular implementations.

Figure 5:
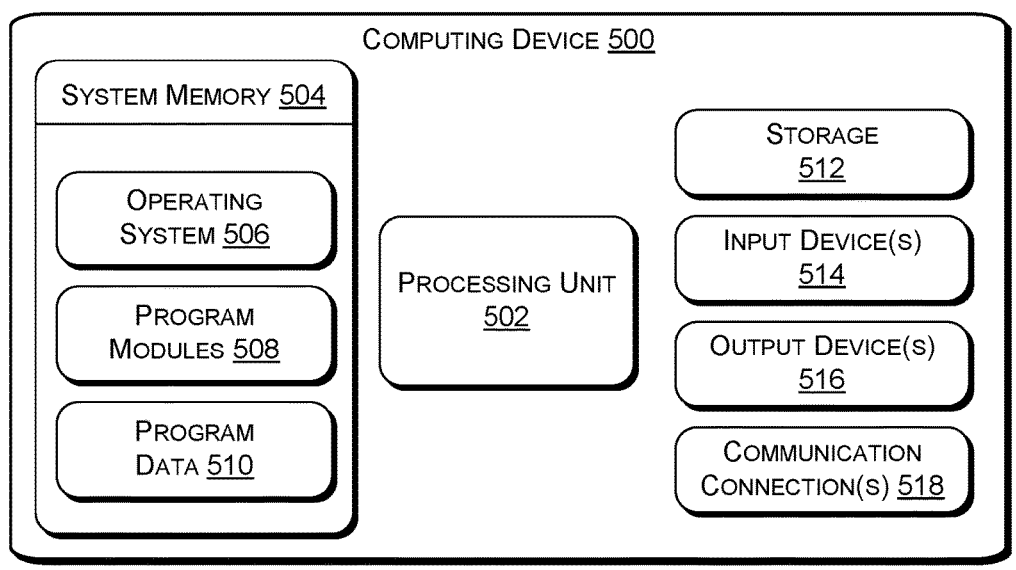
FIG. 5 is a block diagram of an example computing device that may be configured to implement various functionality of a wireless telecommunications system.

FIG. 5 is a block diagram of an illustrative computing device 500 such as may be used to implement various components discussed above, such as the mobility management component 108, the slice selector 110, and the selection policy function 114, as well as other components of the system 100 that are not specifically shown or discussed. Generally, the elements and components of the system 100 may be implemented by any number of computing devices 500, with the various functional and logical components being distributed in various ways across such computing devices.

In various embodiments, the computing device 500 may include at least one processing unit 502 and system memory 504. Depending on the exact configuration and type of computing device, the system memory 504 may be volatile (such as RAM), non-volatile (such as ROM, flash memory, etc.) or some combination of the two. The system memory 504 may include an operating system 506, one or more program modules 508, and may include program data 510.

The computing device 500 may also include additional data storage devices (removable and/or non-removable) such as, for example, magnetic disks, optical disks, or tape. Such additional storage is illustrated in FIG. 5 by storage 512.

Non-transitory computer storage media of the computing device 500 may include volatile and nonvolatile, removable and non-removable media implemented in any method or technology for storage of information, such as computer readable instructions, data structures, program modules, or other data. The system memory 504 and storage 512 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such non-transitory computer-readable storage media may be part of the computing device 500.

In various embodiment, any or all of the system memory 504 and storage 512 may store programming instructions which, when executed, implement some or all of the function functionality described above as being implemented by components of the system 100.

The computing device 500 may also have input device(s) 514 such as a keyboard, a mouse, a touch-sensitive display, voice input device, etc. Output device(s) 516 such as a display, speakers, a printer, etc. may also be included. The computing device 500 may also contain communication connections 518 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A wireless telecommunication system comprising: a network slice selector configured to send a slice request to a slice selection policy function in response to receiving a first create session request; the slice selection policy function being configured to: select a first network slice of multiple network slices of the wireless telecommunication system based at least in part on one or more policies in response to receiving the slice request, and further based at least in part on a subscriber profile for a user wireless communication device associated with the first create session request; and specify the first network slice to the network slice selector by specifying a network address of a gateway of the first network slice; and wherein the network slice selector redirects the first create session request to the first network slice; and wherein neither the network slice selector nor the slice selection policy function is included in the user wireless communication device.

2. The wireless telecommunication system of claim 1, further comprising:
a management component that receives network attach requests from wireless communication devices, the management component being configured to send the first create session request to the network slice selector in response to receiving a network attach request from the wireless communication device.

3. The wireless telecommunication system of claim 2, wherein the network slice selector redirects the first create session request from the management component by sending a redirect response to the management component, the redirect response specifying the first network slice; and
wherein the management component is further configured to send a second create session request to the first network slice in response to receiving the redirect response.

4. The wireless telecommunication system of claim 1, wherein each of the multiple network slices correspond to a respective dedicated core network of the wireless telecommunication system.

5. A method of operating a wireless telecommunication system, the method comprising: receiving, by a computing device and from a user wireless communication device, a slice request responsive to a first create session request; selecting a first network slice of multiple network slices of the wireless telecommunication system in response to receiving the slice request, and based at least in part on one or more slice selection policies and on a subscriber profile associated with the first create session request; and specifying the first network slice to a network slice selector by specifying a network address of a gateway of the first network slice.

6. The method of claim 5, further comprising redirecting the first create session request to the first network slice.

7. The method of claim 5, wherein the first create session request is responsive to a network attach request from a wireless communication device.

8. A method of operating a wireless telecommunication system comprising:
receiving a first create session request, the first create session request being responsive to a demand for service associated with a wireless communication device; determining whether to dynamically change a number of network slices based at least in part on the demand for services; dynamically creating one or more network slices if the demand for services has increased, wherein the one or more network slices are virtual network slices; selecting a first network slice of a plurality of network slices in response to receiving the first create session request, the plurality of network slices including the one or more network slices; specifying a network address of a gateway of the first network slice; redirecting the first create session request to the first network slice; determining that a demand for services has decreased below a threshold value; and dynamically destroying one or more virtual network slices of the virtual network slices at least partially in response to the demand decreasing below the threshold value.

9. The method of claim 8, wherein selecting the first network slice is based at least in part on a subscriber profile for the wireless communication device.

10. The method of claim 8, wherein selecting the first network slice is based at least in part on one or more policies of the wireless telecommunication system.

* * * * *